United States Patent
Tai et al.

(10) Patent No.: US 10,459,592 B2
(45) Date of Patent: Oct. 29, 2019

(54) TOUCH APPARATUS

(71) Applicant: Au Optronics Corporation, Hsinchu (TW)

(72) Inventors: Cheng-An Tai, Hsinchu (TW); Cheng-Hsing Lin, Tainan (TW); Yu-Feng Chien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 15/904,437

(22) Filed: Feb. 26, 2018

(65) Prior Publication Data
US 2019/0163301 A1  May 30, 2019

(30) Foreign Application Priority Data
Nov. 24, 2017 (TW) .............................. 106141044 A

(51) Int. Cl.
G06F 3/045 (2006.01)
G06F 3/041 (2006.01)
G06F 3/047 (2006.01)

(52) U.S. Cl.
CPC .............. G06F 3/047 (2013.01); G06F 3/045 (2013.01); G06F 3/0412 (2013.01)

(58) Field of Classification Search
CPC ......... G06F 3/047; G06F 3/0412; G06F 3/045
USPC ....................................................... 345/174
See application file for complete search history.

(56) References Cited

U.S. PATENT DOCUMENTS

| | | | |
|---|---|---|---|
| 8,717,332 B2* | 5/2014 | Kono | G06F 3/044 345/174 |
| 9,018,536 B2* | 4/2015 | Ullmann | B32B 38/0012 174/257 |
| 9,052,766 B2* | 6/2015 | Dunphy | G06F 3/0412 |
| 9,552,087 B2* | 1/2017 | Ullmann | G06F 3/044 |
| 2009/0219258 A1* | 9/2009 | Geaghan | G06F 3/045 345/173 |
| 2011/0102370 A1* | 5/2011 | Kono | G06F 3/044 345/174 |

(Continued)

FOREIGN PATENT DOCUMENTS

| | | |
|---|---|---|
| TW | 201303670 | 1/2013 |
| TW | M478869 | 5/2014 |
| TW | 201619798 | 6/2016 |

*Primary Examiner* — Benyam Ketema
(74) *Attorney, Agent, or Firm* — JCIPRNET

(57) ABSTRACT

A touch apparatus including a first touch electrode and a second touch electrode is provided. The first touch electrode has first conductive lines constituting a mesh pattern. The second touch electrode has second conductive lines constituting a mesh pattern. The first touch electrode crosses over the second touch electrode to form an interlacing region of the first touch electrode and the second touch electrode. The first conductive lines of the first touch electrode and the second conductive lines of the second touch electrode form M interlacing points within the interlacing region. The first conductive lines of the first touch electrode have N openings within the interlacing region. M and N are positive integers and satisfy:

$$5\% \leq \left(\frac{N}{M+N}\right) \times 100\% \leq 50\%.$$

11 Claims, 10 Drawing Sheets

(56) References Cited

U.S. PATENT DOCUMENTS

| | | | | |
|---|---|---|---|---|
| 2012/0118614 A1* | 5/2012 | Kuriki | ................... | G06F 3/044 |
| | | | | 174/250 |
| 2014/0332262 A1* | 11/2014 | Yoshiki | ................. | G06F 3/044 |
| | | | | 174/264 |
| 2017/0228052 A1* | 8/2017 | Nakamura | ......... | G06F 3/03545 |

* cited by examiner

TOUCH APPARATUS

CROSS-REFERENCE TO RELATED APPLICATION

This application claims the priority benefit of Taiwan application serial no. 106141044, filed on Nov. 24, 2017. The entirety of the above-mentioned patent application is hereby incorporated by reference herein and made a part of this specification.

BACKGROUND

1. Technical Field

The disclosure relates to an electronic apparatus. More particularly, the disclosure relates to a touch apparatus.

2. Description of Related Art

A touch apparatus (e.g., a touch panel) can be operated easily and is therefore widely installed in electronic products (e.g., mobile phones, tablet computers, and satellite navigation devices). The touch apparatus includes first touch electrodes and second touch electrodes interlacing the first touch electrodes. In consideration of visual effects, generally, the first touch electrodes and the second touch electrodes are mostly designed as transparent sensing patterns. The transparent sensing patterns have a high electrical resistance, which is inconducive to electrical properties of the touch apparatus. Therefore, the first touch electrodes and the second touch electrodes has mesh patterns and made of a material having a low electrical resistance (e.g., metal) have been developed.

However, even if the first touch electrodes and the second touch electrodes of the touch apparatus are the transparent sensing patterns or the light-blocking mesh patterns, in an interlacing region of the first touch electrodes and the second touch electrodes, a capacitance value between the first and second touch electrodes is high, which is not conducive to the touch apparatus being operated in a stylus mode.

SUMMARY

The disclosure provides a touch apparatus with good performance.

A touch apparatus provided in an embodiment of the invention includes a first touch electrode and a second touch electrode. The first touch electrode has a plurality of first conductive lines constituting a first mesh pattern. The second touch electrode has a plurality of second conductive lines constituting a second mesh pattern. The first touch electrode crosses over the second touch electrode to form an interlacing region. The plurality of first conductive lines of the first touch electrode and the plurality of second conductive lines of the second touch electrode form M interlacing points within the interlacing region. The first conductive lines of the first touch electrode have N first openings within the interlacing region. M and N are positive integers and satisfy:

$$5\% \leq \left(\frac{N}{M+N}\right) \times 100\% \leq 50\%.$$

A touch apparatus provided in an embodiment of the invention includes a first touch electrode and a second touch electrode. The first touch electrode has a plurality of first conductive lines constituting a first mesh pattern. The second touch electrode has a plurality of second conductive lines constituting a second mesh pattern. The first touch electrode crosses over the second touch electrode to form an interlacing region. The first conductive lines of the first touch electrode have a plurality of first openings. Each of the plurality of first openings overlaps a solid portion of a corresponding one of the plurality of second conductive lines. Each of the plurality of first openings is defined by two adjacent ends. The two adjacent ends are respectively spaced from the solid portion of corresponding one of the plurality of second conductive lines by a distance D, and D satisfies: 1 μm≤D≤10 μm.

A touch apparatus provided in an embodiment of the invention includes a first touch electrode and a second touch electrode. The first touch electrode has a plurality of first conductive lines constituting a first mesh pattern. The second touch electrode has a plurality of second conductive lines constituting a second mesh pattern. The first touch electrode crosses over the second touch electrode to form an interlacing region. The plurality of first conductive lines of the first touch electrode and the plurality of second conductive lines of the second touch electrode form M interlacing points within the interlacing region. The plurality of first conductive lines of the first touch electrode have N first openings within the interlacing region. The plurality of second conductive lines of the second touch electrode have L second openings overlapping solid portions of the plurality of first conductive lines within the interlacing region. M, N, and L are positive integers and satisfy:

$$5\% \leq \left(\frac{N+L}{M+N+L}\right) \times 100\% \leq 50\%.$$

In an embodiment of the invention, each of a plurality of first openings is defined by two adjacent ends, and each of the plurality of first openings overlaps a solid portion of a corresponding one of the plurality of second conductive lines.

In an embodiment of the invention, the ends of the plurality of first conductive lines are respectively spaced from the solid portions of the plurality of second conductive lines by a distance D, and D satisfies: 1 μm≤D≤10 μm.

In an embodiment of the invention, the touch apparatus further includes a plurality of connection traces and a driving circuit. The plurality of connection traces are respectively located at two opposite sides of the first touch electrode and electrically connected to the first touch electrode. The plurality of connection traces are electrically connected between the first touch electrode and the driving circuit.

In an embodiment of the invention, the plurality of second conductive lines of the second touch electrode have a plurality of second openings within the interlacing region, and at least one of the plurality of first openings overlaps at least one of the plurality of second openings.

In an embodiment of the invention, the plurality of second conductive lines of the second touch electrode have K second openings within the interlacing region, and K is a positive integer and satisfies:

$$5\% \leq \left(\frac{K}{M+K}\right) \times 100\% \leq 50\%.$$

In an embodiment of the invention, the plurality of first openings is randomly distributed on a substrate.

A touch apparatus provided in an embodiment of the invention includes a first touch electrode and a second touch electrode. The first touch electrode crosses over the second touch electrode to form an interlacing region. A plurality of first conductive lines of the first touch electrode and a plurality of second conductive lines of the second touch electrode form M interlacing points within the interlacing region. The plurality of first conductive lines of the first touch electrode have N first openings within the interlacing region. M and N are positive integers and satisfy:

$$5\% \leq \left(\frac{N}{M+N}\right) \times 100\% \leq 50\%.$$

By designing $$\left(\frac{N}{M+N}\right) \times 100\%$$

within an specific range, not only can the capacitance value between the first touch electrode and the second touch electrode be reduced, but also the electrical resistance of the first touch electrode is not easily increased because of the arrangement of the N first openings. Thereby, the touch apparatus may have both the appropriate capacitance value and the appropriate electrical resistance value and may be operated in a stylus mode.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Reference will now be made in detail to the embodiments of the invention, examples of which are illustrated in accompanying figures. Wherever possible, identical reference numbers are used in figures and descriptions to refer to identical or similar parts.

Figure 1:
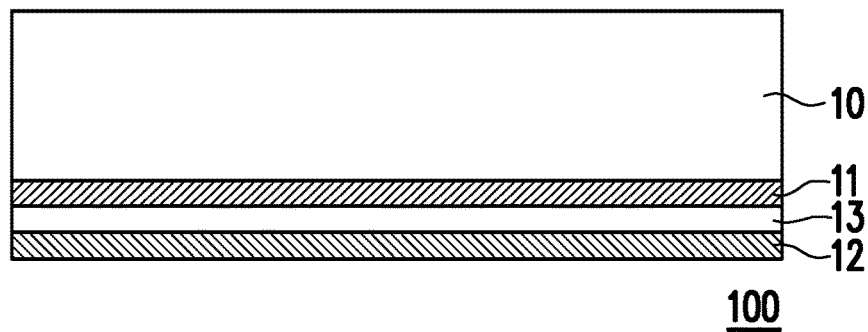
FIG. 1 is a schematic cross-sectional view of a touch apparatus according to an embodiment of the invention.
Figure 2:
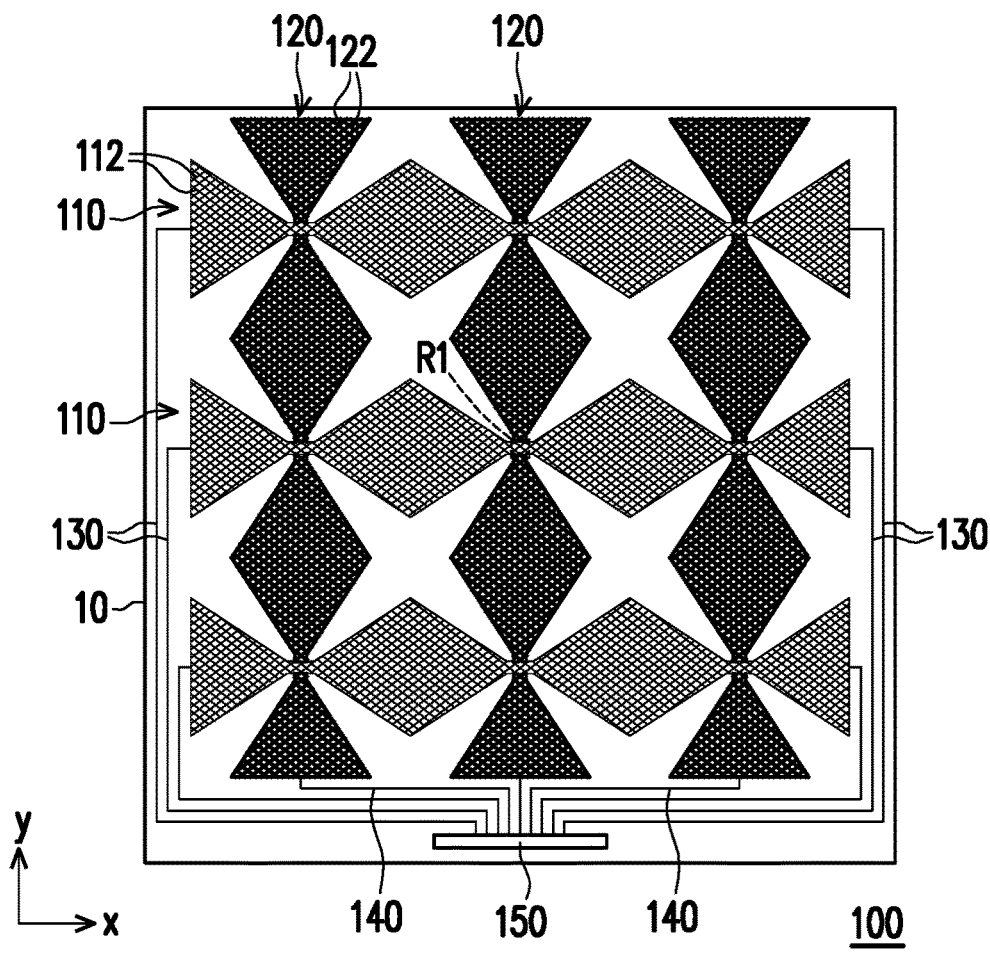
FIG. 2 is a schematic top view of a touch apparatus according to a first embodiment of the invention.

FIG. 1 is a schematic cross-sectional view of a touch apparatus according to an embodiment of the invention. FIG. 2 is a schematic top view of a touch apparatus according to a first embodiment of the invention. Referring to FIG. 1 and FIG. 2, a touch apparatus 100 includes a substrate 10, a first conductive layer 11 and a second conductive layer 12 both disposed on the substrate 10, and an insulation layer 13 disposed between the first conductive layer 11 and the second conductive layer 12. The first conductive layer 11 has a plurality of first touch electrodes 110. The second conductive layer 12 has a plurality of second touch electrodes 120. The first touch electrodes 110 substantially extend in a direction x, the second touch electrodes 120 roughly extend in a direction y, and the direction x interlaces with the direction y. For example, the substrate 10 provided in the embodiment may be a cover glass, the first touch electrodes 110 and the second touch electrodes 120 are disposed on the substrate 10, and the insulation layer 13 is located between the first touch electrodes 110 and the second touch electrodes 120. The touch apparatus 100 provided in the embodiment may be a one glass solution (OGS) touch panel. However, the invention is not limited thereto. The touch apparatus 100 may also be GG2, GF2, GG, GF, G1F, GFF or the touch panel of other suitable types, which is not limited in the invention.

Referring to FIG. 2, the first touch electrodes 110 have a plurality of first conductive lines 112 constituting a mesh pattern. The second touch electrodes 120 have a plurality of second conductive lines 122 constituting a mesh pattern. In the embodiment, an outer profile of the first touch electrodes 110 and an outer profile of the second touch electrodes 120 are rhombus patterns serially connected to each other. However, the invention is not limited thereto. In other embodiments, the outer profile of the first touch electrodes 110 and/or the outer profile of the second touch electrodes 120 may also be of other suitable shapes (e.g., a shape of a long strip).

According to the embodiment, in consideration of conductivity, a material of the first touch electrodes 110 and a material of the second touch electrodes 120 are metal with low electrical resistance. However, the invention is not limited thereto. In other embodiments, the first touch electrodes 110 and the second touch electrodes 120 may also be made of other conductive materials, such as an alloy, a metal nitride material, a metal oxide material, a metal oxynitride material, or a stacked layer having the metal material and other conductive materials. Additionally, in consideration of visual effects, the first touch electrodes 110 and/or the second touch electrodes 120 provided in the embodiment may optionally have a blackened surface facing a user, so that the first touch electrodes 110 and/or the second touch electrodes 120 are unnoticeable to the user, but the invention is not limited thereto.

Figure 3:
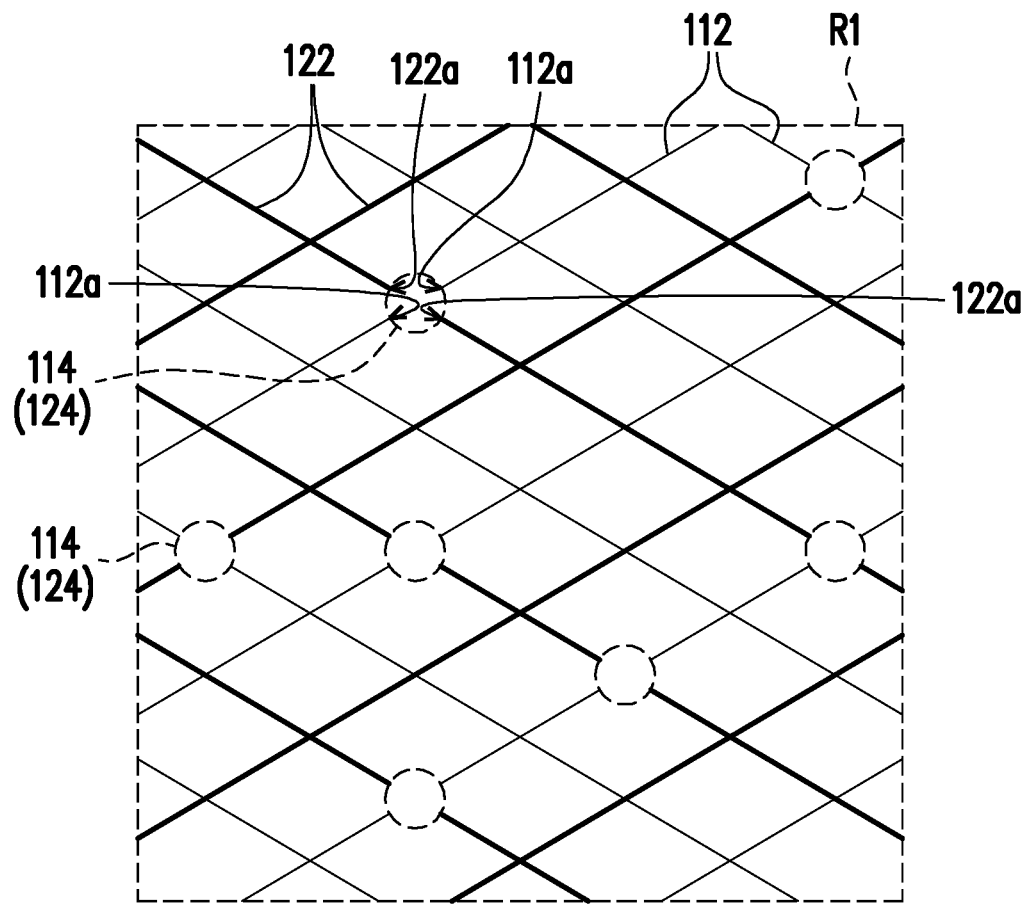
FIG. 3 is a schematic enlarged view of the interlacing region R1 shown in FIG. 2.

FIG. 3 is a schematic enlarged view of the interlacing region R1 shown in FIG. 2. Referring to FIG. 2, the first touch electrodes 110 cross over the second touch electrodes 120 to form a plurality of interlacing regions R1. Referring to FIG. 2 and FIG. 3, FIG. 3 is the schematic enlarged view of one of the interlacing regions R1 shown in FIG. 2. Referring to FIG. 3, the first conductive lines 112 (shown as thin lines) of the first touch electrode 110 and the second conductive lines 122 (shown as bold lines) of the second touch electrode 120 form M interlacing points. The first conductive lines 112 of the first touch electrode 110 have N first openings 114 within the interlacing region R1. Each of the N first openings 114 is defined by two adjacent ends 112a of corresponding first conductive lines 112. The end 112a, for example, is a cutting edge of the first conductive lines 112, and therefore the first mesh pattern has many cutting edges, and two adjacent ones of the cutting edges face to each other so as to form a single one first opening 114. The exemplary arrangement of the N first openings 114 does not cause any part of the first touch electrode 110 to float. M and N are positive integers and satisfy:

$$5\% \leq \left(\frac{N}{M+N}\right) \times 100\% \leq 50\%.$$

For example, within the interlacing region R1 of the embodiment shown in FIG. 3, the first conductive lines 112 of the first touch electrode 110 and the second conductive lines 122 of the second touch electrode 120 form 17 interlacing points, and the first conductive lines 112 of the first touch electrode 110 have 7 first openings 114.

$$\left(\frac{N}{M+N}\right) \times 100\% = \left(\frac{7}{17+7}\right) \times 100\% \approx 29.17\%.$$

However, the invention is not limited thereto. In other embodiments, $$\left(\frac{N}{M+N}\right) \times 100\%$$

may also be designed to be other appropriate values based on actual needs.

An overlapping area of the first touch electrode 110 and the second touch electrode 120 within the interlacing region R1 may be reduced because of the arrangement of the N first openings 114 of the first touch electrode 110, so as to reduce a capacitance value between the first touch electrode 110 and the second touch electrode 120. The capacitance value between the first touch electrode 110 and the second touch electrode 120 may be reduced by designing $$\left(\frac{N}{M+N}\right) \times 100\%$$

to be in an appropriate range. An electrical resistance of the first touch electrode 110 is not easily increased because of the arrangement of the N first openings 114. Thereby, the touch apparatus 100 may have both the appropriate capacitance value and the appropriate electrical resistance value and may be optionally operated in a stylus mode.

Referring to FIG. 3, within the interlacing region R1 of the embodiment, the second conductive lines 122 of the second touch electrode 120 may optionally have a plurality of second openings 124. Each of the second openings 124 is defined by two adjacent ends 122a of corresponding second conductive lines 122. The end 122a, for example, is a cutting edge of the second conductive lines 122, and therefore the second mesh pattern has many cutting edges, and two adjacent ones of the cutting edges face to each other so as to form a single one first opening 124. The exemplary arrangement of the second openings 124 does not cause any part of the second touch electrode 120 to float. In the embodiment, the second openings 124 of the second touch electrode 120 may respectively overlap the N first openings 114 of the first touch electrode 110. Thereby, the overlapping area of the first touch electrode 110 and the second touch electrode 120 within the interlacing region R1 may be further reduced, and the capacitance value between the first touch electrode 110 and the second touch electrode 120 may be significantly reduced.

For example, in the embodiment, the second conductive lines 122 of the second touch electrode 120 have K second openings 124 within the interlacing region R1, and K is a positive integer and satisfies:

$$5\% \leq \left(\frac{K}{M+K}\right) \times 100\% \leq 50\%.$$

For example, within the interlacing region R1 of the embodiment shown in FIG. 3, the first conductive lines 112 of the first touch electrode 110 and the second conductive lines 122 of the second touch electrode 120 form 17 interlacing points, and the second conductive lines 122 of the second touch electrode 120 have 7 second openings 124.

$$\left(\frac{K}{M+K}\right) \times 100\% = \left(\frac{7}{17+7}\right) \times 100\% \approx 29.17\%.$$

However, the invention is not limited thereto. In other embodiments, $$\left(\frac{K}{M+K}\right) \times 100\%$$

may also be designed to be other appropriate values based on actual needs.

In the embodiment, the N first openings 114 and/or the K second openings 124 are randomly distributed on the substrate 10. The existence of the N first openings 114 and/or the K second openings 124 may be unnoticeable to a human eye by irregularly arranging the N first openings 114 and/or the K second openings 124, thereby enhancing visual effects of the touch apparatus 100. However, the invention is not limited thereto. In other embodiments, the N first openings 114 and/or the K second openings 124 may be disposed in other suitable manners.

In the embodiment, one of the first touch electrode 110 and the second touch electrode 120 is a receiving electrode Rx, and the other of the first touch electrode 110 and the second touch electrode 120 is a driving electrode Tx. Within the interlacing region R1 of the embodiment, the receiving electrode Rx and the driving electrode Tx of the touch apparatus 100 may optionally have openings, but the invention is not limited thereto.

Referring to FIG. 2, the touch apparatus 100 provided in the embodiment further includes a plurality of connection traces 130, a plurality of connection traces 140, and a driving circuit 150. The connection traces 130 are respectively electrically connected to the first touch electrodes 110. The first touch electrodes 110 are electrically connected to the driving circuit 150 (e.g., IC, but the driving circuit 150 is not limited thereto) via the connection traces 130. The connection traces 140 are respectively electrically connected to the second touch electrodes 120. The second touch electrodes 120 are electrically connected to the driving circuit 150 via the connection traces 140. For example, in the embodiment, each of the first touch electrodes 110 is electrically connected to the driving circuit 150 via two connection traces 130 located at two opposite sides of the first touch electrodes 110, and each of the second touch electrodes 120 is electrically connected to the driving circuit 150 via a corresponding one of the connection traces 140. However, the invention is not limited thereto. In other embodiments, the first touch electrodes 110 and the second touch electrodes 120 may also be electrically connected to the driving circuit 150 in other ways. For example, each of the first touch electrodes 110 is electrically connected to the driving circuit 150 via only one of the connection traces 130.

Figure 4:
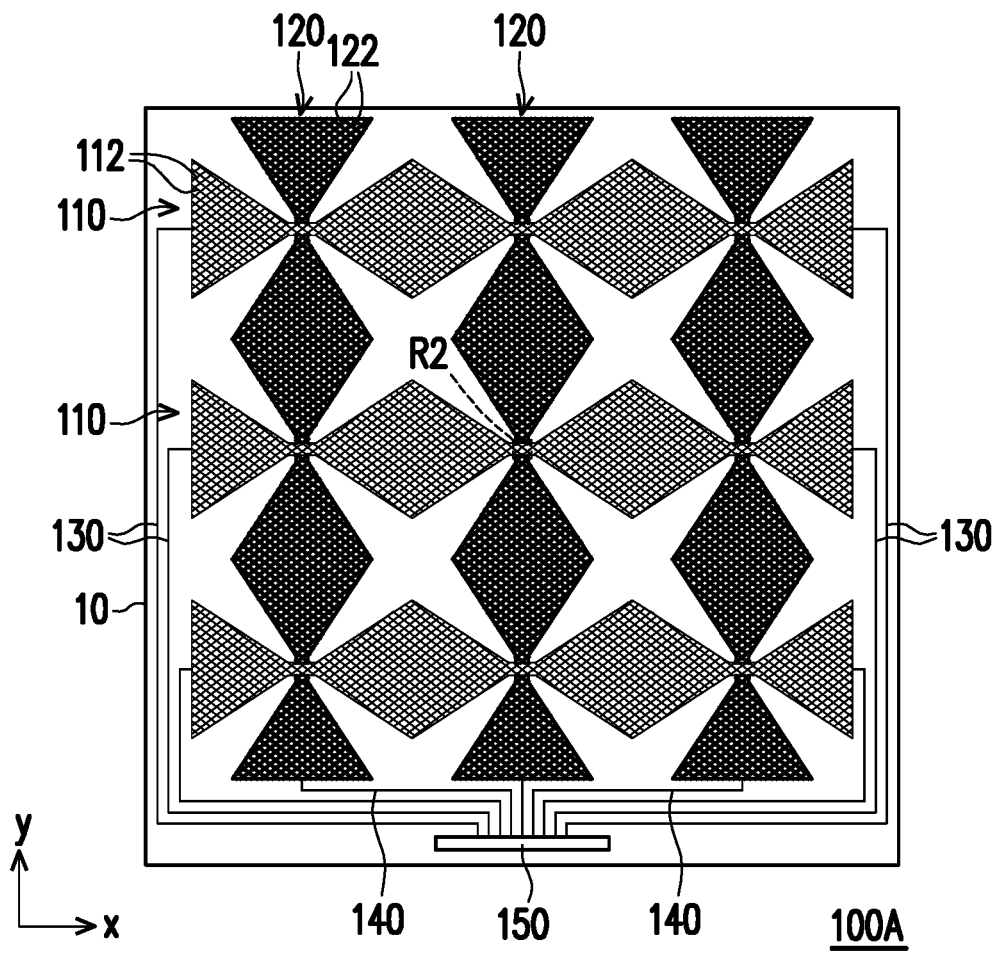
FIG. 4 is a schematic top view of a touch apparatus according to a second embodiment of the invention.
Figure 5:
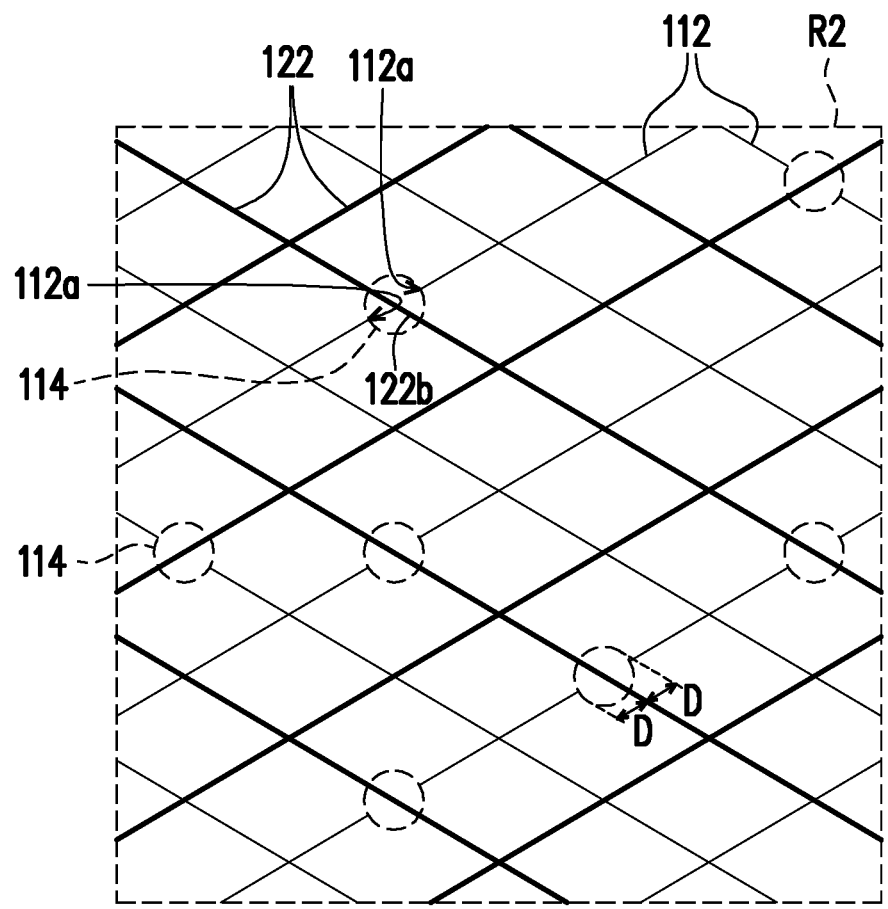
FIG. 5 is a schematic enlarged view of the interlacing region R2 shown in FIG. 4.

FIG. 4 is a schematic top view of a touch apparatus according to a second embodiment of the invention. FIG. 5 is a schematic enlarged view of the interlacing region R2 shown in FIG. 4. Referring to FIG. 4 and FIG. 5, a touch apparatus 100A is similar to the touch apparatus 100, while the difference therebetween is as follows: the second conductive lines 122 of the second touch electrode 120 of the touch apparatus 100A may not have the K second openings 124 within the interlacing region R2. In the embodiment, each of the N first openings 114 of the first touch electrode 110 overlaps a solid portion 122b of a corresponding one of the second conductive lines 122. To explain further, the ends 112a of the first conductive lines 112 defining the N first openings 114 are respectively spaced from the solid portions 122b of the second conductive lines 122 by a horizontal distance D. The capacitance value between the first touch electrode 110 and the second touch electrode 120 may be reduced via an appropriate design of the distance D, so that the first touch electrode 110 may have the appropriate electrical resistance. For example, in the embodiment, 1 μm≤D≤10 μm, but the invention is not limited thereto.

In the embodiment, the first touch electrode 110 is, for example, the driving electrode Tx, and the second touch electrode 120 is, for example, the receiving electrode Rx. Within the interlacing region R2 of the embodiment, the driving electrode Tx of the touch apparatus 100A may optionally have openings (i.e., the N first openings 114) and the receiving electrode Rx of the touch apparatus 100A may optionally not have openings, but the invention is not limited thereto.

Figure 6:
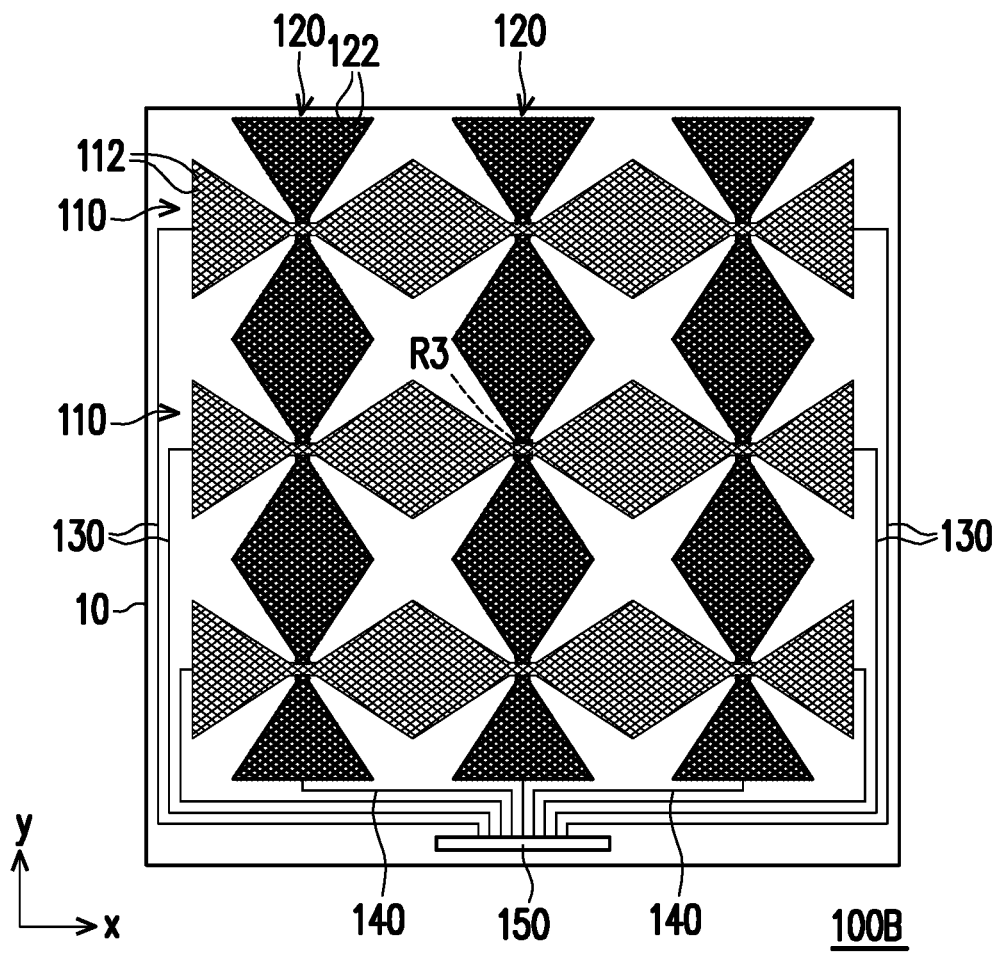
FIG. 6 is a schematic top view of a touch apparatus according to a third embodiment of the invention.
Figure 7:
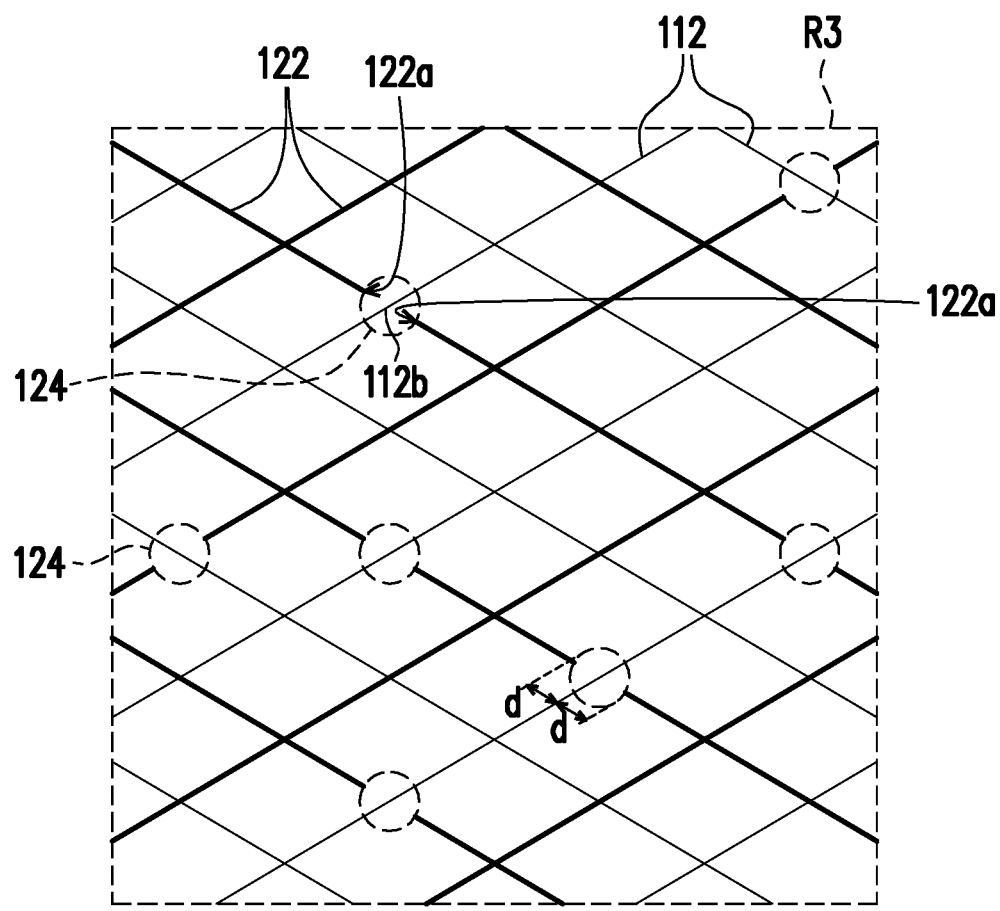
FIG. 7 is a schematic enlarged view of the interlacing region R3 shown in FIG. 6.

FIG. 6 is a schematic top view of a touch apparatus according to a third embodiment of the invention. FIG. 7 is a schematic enlarged view of the interlacing region R3 shown in FIG. 6. Referring to FIG. 6 and FIG. 7, a touch apparatus 100B is similar to the touch apparatus 100, while the difference therebetween is as follows: the first conductive lines 112 of the first touch electrode 110 of the touch apparatus 100B may not have the N first openings 114 within the interlacing region R3. In the embodiment, each of the K second openings 124 of the second touch electrode 120 overlaps a solid portion 112b of a corresponding one of the first conductive lines 112. To explain further, the ends 122a of the second conductive lines 122 defining the K second openings 124 are respectively spaced from the solid portions 112b of the first conductive lines 112 by a horizontal distance d. The capacitance value between the first touch electrode 110 and the second touch electrode 120 may be reduced via an appropriate design of the distance d, so that the second touch electrode 120 may have the appropriate electrical resistance. For example, in the embodiment, 1 μm≤d≤10 μm, but the invention is not limited thereto.

In the embodiment, the first touch electrode 110 is, for example, the driving electrode Tx, and the second touch electrode 120 is, for example, the receiving electrode Rx. Within the interlacing region R3 of the embodiment, the driving electrode Tx of the touch apparatus 100B may optionally not have the openings, and the receiving electrode Rx of the touch apparatus 100B may optionally have openings (i.e., the K second openings 124), but the invention is not limited thereto.

Table 1 below lists simulation results of the capacitance value between the first touch electrode and the second touch electrode in a comparative example and the capacitance value between the first touch electrode and the second touch electrode provided in the second or third embodiment of the invention. A difference between the touch apparatus of the comparative example and the touch apparatus provided in one or more embodiments of the invention is that the first touch electrode and the second touch electrode provided in the comparative example do not have the openings within the interlacing region. It can be confirmed from Table 1 below that the capacitance value between the first touch electrode 110 and the second touch electrode 120 may be significantly reduced when at least one of the first touch electrode 110 and the second touch electrode 120 has openings within the interlacing region. In addition, it can also be confirmed from Table 1 below that the capacitance value between the first touch electrode 110 and the second touch electrode 120 is lower when a space (i.e., D of FIG. 5 or d of FIG. 7) between the ends one of the conductive lines defining the openings and the solid portion of the other one of the conductive lines is greater.

TABLE 1

| | | Capacitance Value (pF) between the First Touch Electrode and the Second Touch Electrode |
|---|---|---|
| Comparative Example | | 2.434 |
| Second or Third Embodiment | D (or d) = 4 μm | 2.173 |
| | D (or d) = 7 μm | 2.149 |
| | D (or d) = 10 μm | 2.122 |

Figure 8:
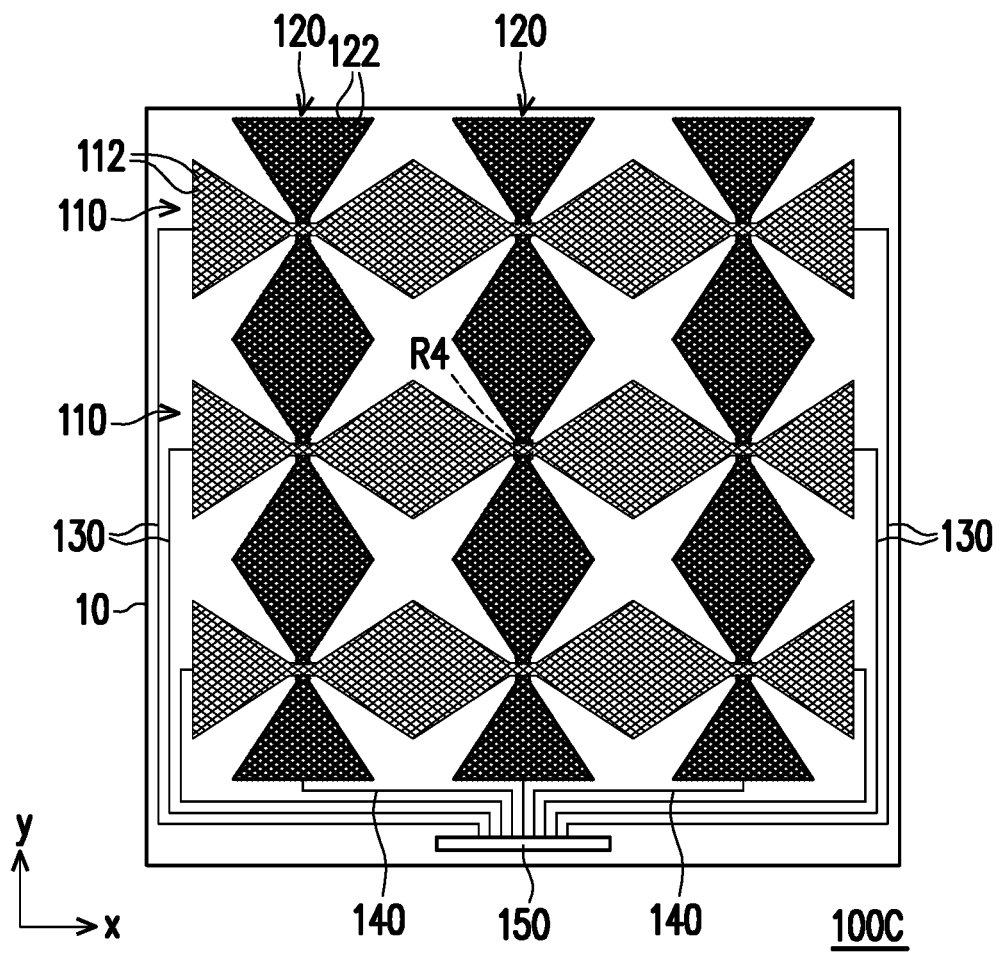
FIG. 8 is a schematic top view of a touch apparatus according to a fourth embodiment of the invention.
Figure 9:
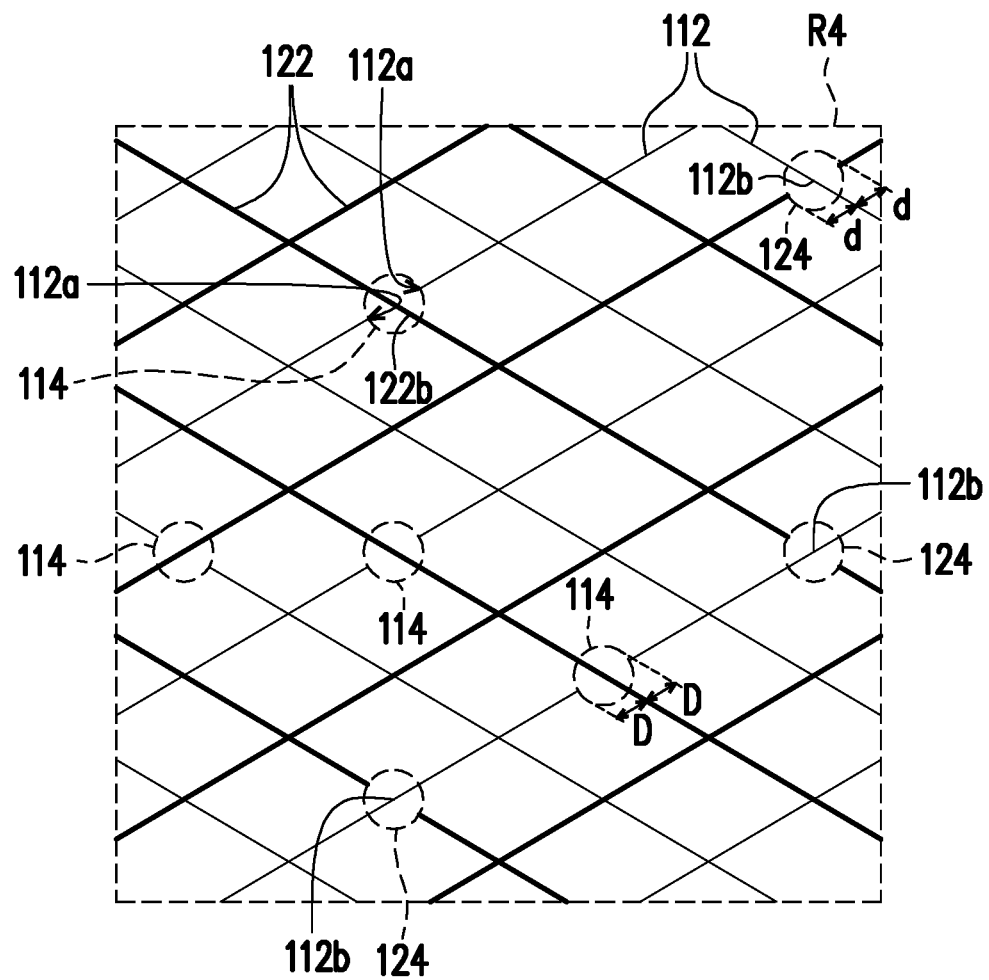
FIG. 9 is a schematic enlarged view of the interlacing region R4 shown in FIG. 8.

FIG. 8 is a schematic top view of a touch apparatus according to a fourth embodiment of the invention. FIG. 9 is a schematic enlarged view of the interlacing region R4 shown in FIG. 8. Referring to FIG. 8 and FIG. 9, a touch apparatus 100C is similar to the touch apparatus 100B, while the difference therebetween is as follows: in addition to the fact that the first conductive lines 112 of the touch apparatus 100C have the N first openings 114 and that the first conductive lines 112 and the second conductive lines 122 form the M interlacing points, the second conductive lines 122 of the touch apparatus 100C also have L second openings 124 overlapping solid portions 112b of the corresponding first conductive lines 112. M, N, and L are positive integers and satisfy:

$$5\% \leq \left(\frac{N+L}{M+N+L}\right) \times 100\% \leq 50\%.$$

For example, Within the interlacing region R4 of the embodiment shown in FIG. 9, the first conductive lines 112 of the first touch electrode 110 and the second conductive lines 122 of the second touch electrode 120 form 17 interlacing points, the first conductive lines 112 of the first touch electrode 110 have 4 first openings 114, and the second conductive lines 122 of the second touch electrode 120 have 3 second openings 124 overlapping the solid portions 112b of the first conductive lines 112.

$$\left(\frac{N+L}{M+N+L}\right) \times 100\% = \left(\frac{4+3}{17+4+3}\right) \times 100\% \approx 29.17\%,$$

but the invention is not limited thereto.

Figure 10:
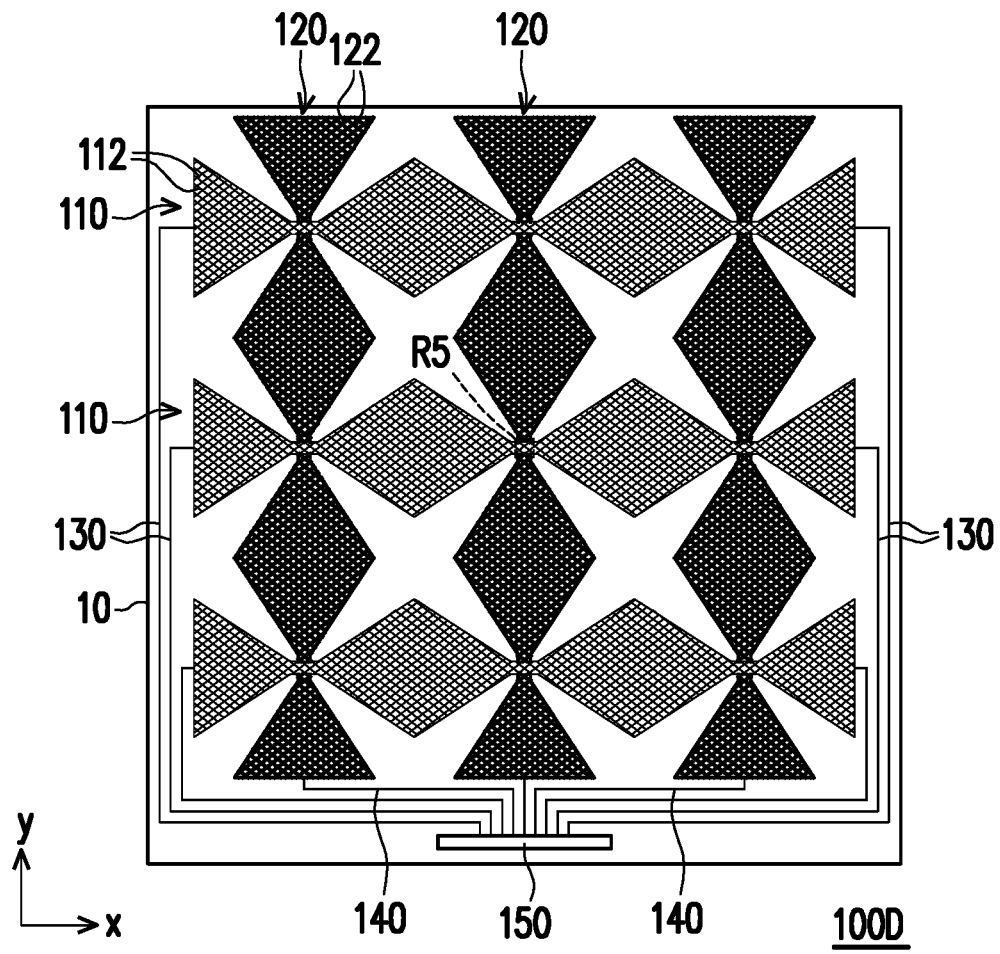
FIG. 10 is a schematic top view of a touch apparatus according to a fifth embodiment of the invention.
Figure 11:
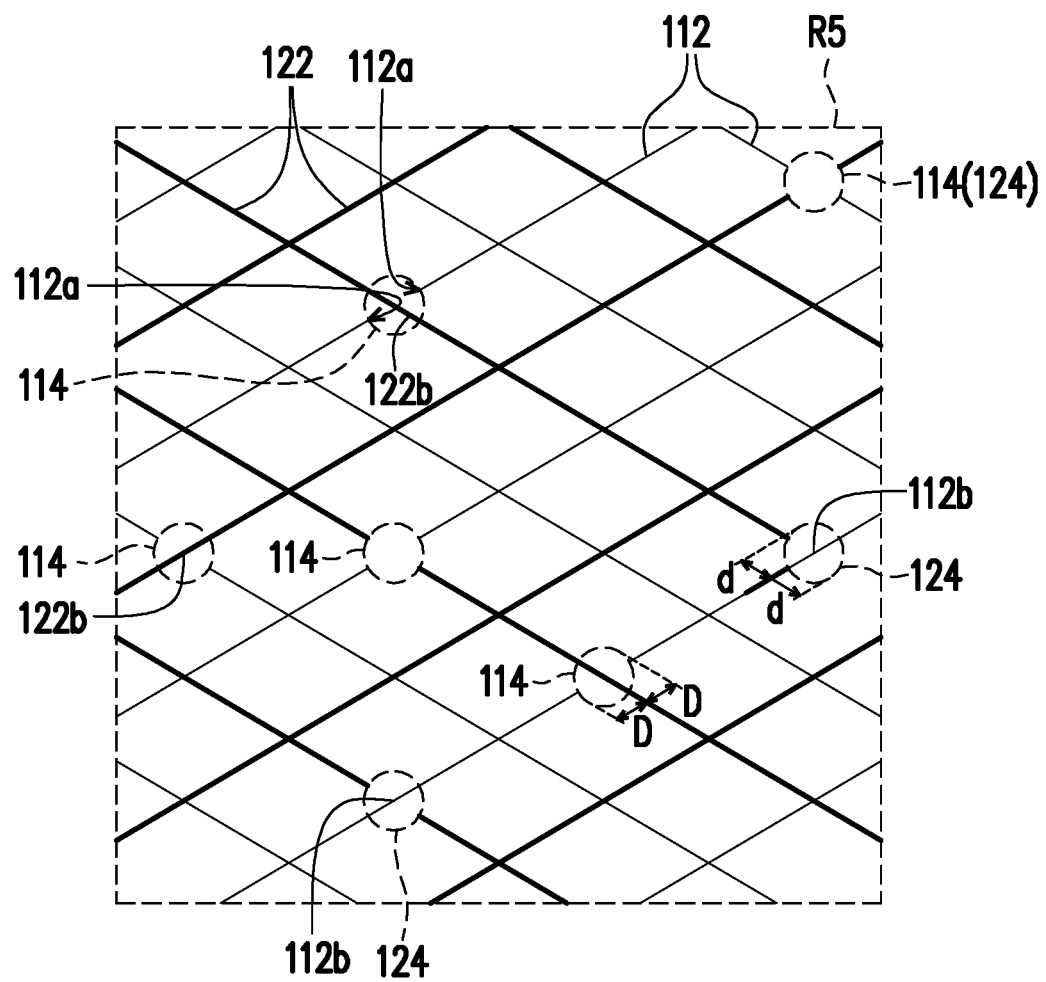
FIG. 11 is a schematic enlarged view of the interlacing region R5 shown in FIG. 10.

FIG. 10 is a schematic top view of a touch apparatus according to a fifth embodiment of the invention. FIG. 11 is a schematic enlarged view of the interlacing region R5 shown in FIG. 10. Referring to FIG. 10 and FIG. 11, a touch apparatus 100D is similar to the touch apparatus 100C, while the difference therebetween is as follows: in the touch apparatus 100C shown in FIG. 9, the L second openings 124 of the second conductive lines 122 are all overlapped with the solid portions 112b of the first conductive lines 112, while in the touch apparatus 100D shown in FIG. 11, one portion of the L second openings 124 of the second conductive lines 122 is overlapped with the solid portions 112b of the first conductive lines 112 and the other portion of the L second openings 124 of the second conductive lines 122 is overlapped with the N first openings 114. The first conductive lines 112 of the touch apparatus 100D have the N first openings 114, the first conductive lines 112 and the second conductive lines 122 of the touch apparatus 100D form the M interlacing points, and the second conductive lines 122 of the touch apparatus 100D have the L second openings 124 overlapping the solid portions 112b of the first conductive lines 112. M, N, and L satisfy:

$$5\% \leq \left(\frac{N+L}{M+N+L}\right) \times 100\% \leq 50\%.$$

For example, within the interlacing region R5 of the embodiment shown in FIG. 11, the first conductive lines 112 of the first touch electrode 110 and the second conductive lines 122 of the second touch electrode 120 form 17 interlacing points, the first conductive lines 112 of the first touch electrode 110 have 5 first openings 114, and the second conductive lines 122 of the second touch electrode 120 have 2 second openings 124 overlapping the solid portions 112b of the first conductive lines 112.

$$\left(\frac{N+L}{M+N+L}\right) \times 100\% = \left(\frac{5+2}{17+5+2}\right) \times 100\% \approx 29.17\%,$$

but the invention is not limited thereto.

To sum up, the touch apparatus provided in one or more embodiments of the invention includes the first touch electrode and the second touch electrode. The first touch electrode has the first conductive lines constituting the mesh pattern. The second touch electrode has the second conductive lines constituting the mesh pattern. The first touch electrode crosses over the second touch electrode to form the interlacing region. The first conductive lines of the first touch electrode and the second conductive lines of the second touch electrode form the M interlacing points within the interlacing region. The first conductive lines of the first touch electrode have the N first openings within the interlacing region. M and N are positive integers and satisfy:

$$5\% \leq \left(\frac{N}{M+N}\right) \times 100\% \leq 50\%.$$

By designing $$\left(\frac{N}{M+N}\right) \times 100\%$$

to be within the appropriate range, not only can the capacitance value between the first touch electrode and the second touch electrode be reduced, but also the electrical resistance of the first touch electrode is not easily increased because of the arrangement of the N first openings. Thereby, the touch apparatus may have both the appropriate capacitance value and the appropriate electrical resistance value and may be operated in the stylus mode.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:

1. A touch apparatus, comprising:
a first touch electrode, having a plurality of first conductive lines constituting a first mesh pattern; and
a second touch electrode, having a plurality of second conductive lines constituting a second mesh pattern, wherein the first touch electrode crosses over the second touch electrode to form an interlacing region, wherein the first conductive lines of the first touch electrode and the second conductive lines of the second touch electrode form M interlacing points within the interlacing region, wherein the first conductive lines of the first touch electrode have N first openings within the interlacing region, and wherein M and N are positive integers and satisfy:

$$5\% \leq \left(\frac{N}{M+N}\right) \times 100\% \leq 50\%,$$

wherein the second conductive lines of the second touch electrode have K second openings within the interlacing region, and wherein at least one of the N first openings overlaps at least one of the K second openings within the interlacing region.

2. The touch apparatus of claim 1, wherein each of the N first openings is defined by two adjacent ends of corresponding ones of the first conductive lines, and overlaps a solid portion of a corresponding one of the second conductive lines.

3. The touch apparatus of claim 2, wherein the two adjacent ends of the corresponding ones of the first conductive lines are respectively spaced from the solid portions of the corresponding one of the second conductive lines by a distance D, and D satisfies: 1 μm≤D≤10 μm.

4. The touch apparatus of claim 2, further comprising:
a plurality of connection traces, respectively located at two opposite sides of the first touch electrode and electrically connected to the first touch electrode; and
a driving circuit, wherein the connection traces are electrically connected between the first touch electrode and the driving circuit.

5. The touch apparatus of claim 1, wherein K is a positive integer and satisfies:

$$5\% \leq \left(\frac{k}{n+k}\right) \times 100\% \leq 50\%.$$

6. The touch apparatus of claim 1, further comprising:
a substrate, wherein the first touch electrode and the second touch electrode are disposed on the substrate, and the N first openings are randomly distributed on the substrate.

7. A touch apparatus, comprising:
a first touch electrode, having a plurality of first conductive lines constituting a first mesh pattern; and
a second touch electrode, having a plurality of second conductive lines constituting a second mesh pattern, wherein the first touch electrode crosses over the second touch electrode to form an interlacing region, wherein the first conductive lines of the first touch electrode has a plurality of first openings within the interlacing region, and wherein each of the first openings overlaps only one solid portion of only one corresponding second conductive line and is defined by two adjacent ends of corresponding ones of the first conductive lines and the two adjacent ends of the corresponding ones of the first conductive lines are respectively spaced from the solid portion of the corresponding second conductive line by a distance D, and D satisfies: 1 μm≤D≤10 μm.

8. The touch apparatus of claim 7, further comprising:
a plurality of connection traces, respectively located at two opposite sides of the first touch electrode and electrically connected to the first touch electrode; and
a driving circuit, wherein the plurality of connection traces are electrically connected between the first touch electrode and the driving circuit.

9. The touch apparatus of claim 7, further comprising:
a substrate, wherein the first touch electrode and the second touch electrode are disposed on the substrate, and the first openings are randomly distributed on the substrate.

10. A touch apparatus, comprising:
a first touch electrode, having a plurality of first conductive lines constituting a first mesh pattern; and
a second touch electrode, having a plurality of second conductive lines constituting a second mesh pattern, wherein the first touch electrode crosses over the second touch electrode to form an interlacing region, wherein the first conductive lines of the first touch electrode and the second conductive lines of the second touch electrode form M interlacing points within the interlacing region, wherein the first conductive lines of the first touch electrode have N first openings within the interlacing region, wherein the second conductive lines of the second touch electrode have L second openings overlapping solid portions of the first conductive lines within the interlacing region, and wherein M, N, and L are positive integers and satisfy:

$$5\% \leq \left(\frac{N+L}{M+N+L}\right) \times 100\% \leq 50\%.$$

11. A touch apparatus, comprising:
a first touch electrode, having a plurality of first conductive lines constituting a first mesh pattern; and
a second touch electrode, having a plurality of second conductive lines constituting a second mesh pattern, wherein the first touch electrode crosses over the second touch electrode to form an interlacing region, wherein the first conductive lines of the first touch electrode has a plurality of first openings within the interlacing region, and wherein each of the first openings overlaps a solid portion of a corresponding one of the second conductive lines and is defined by two adjacent ends of corresponding ones of the first conductive lines and the two adjacent ends of the corresponding ones of the first conductive lines are respectively spaced from the solid portion of the corresponding one of the second conductive lines by a distance D, and D satisfies: 1 μm≤D≤10 μm; and
a substrate, wherein the first touch electrode and the second touch electrode are disposed on the substrate, and the first openings are randomly distributed on the substrate.

* * * * *